UNITED STATES PATENT OFFICE.

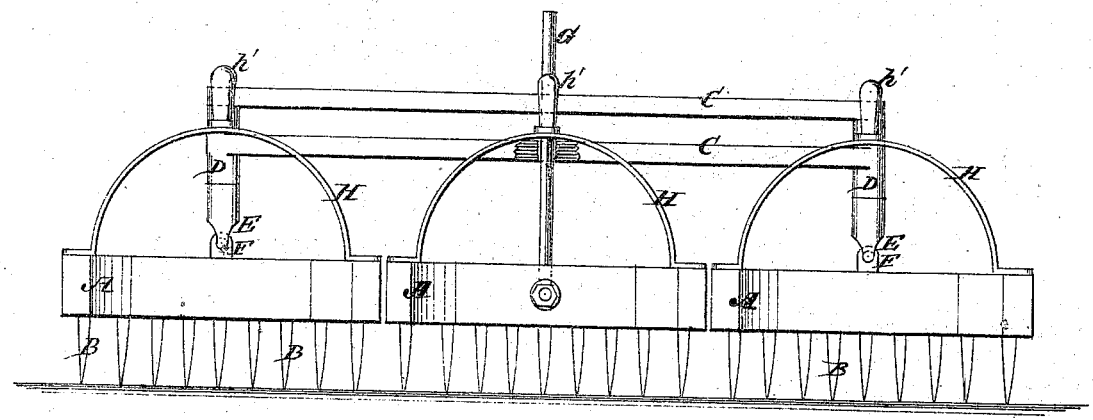
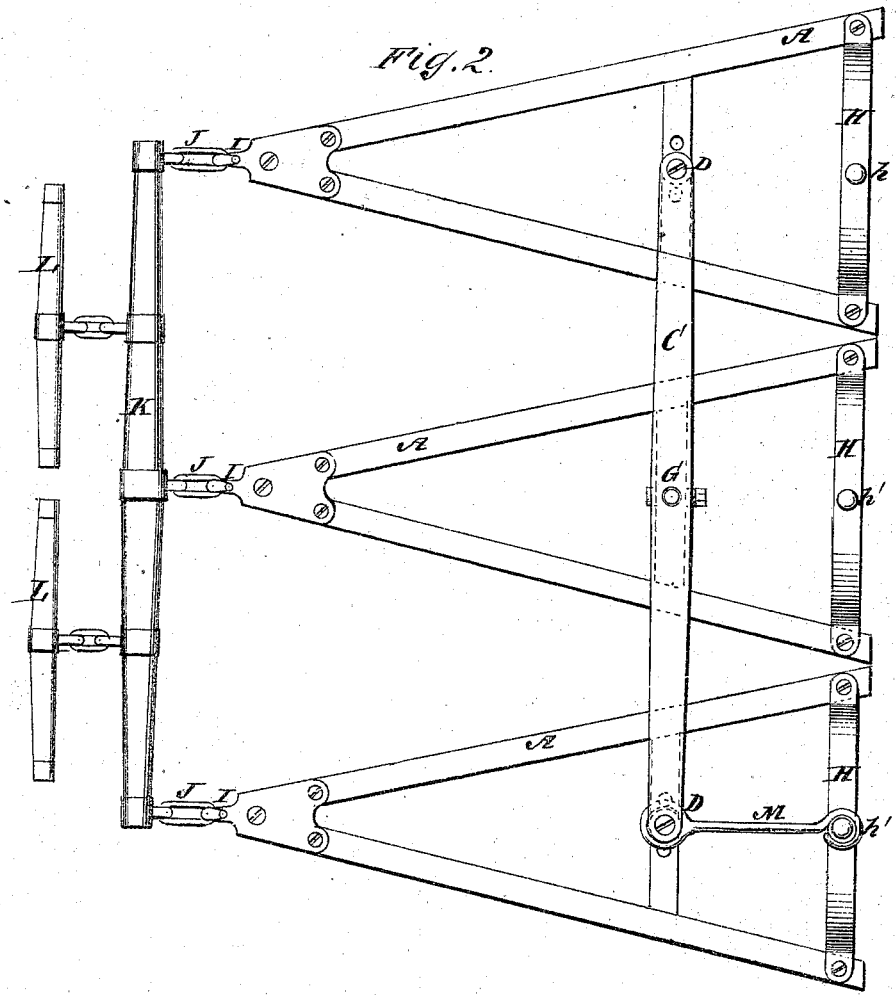

JAMES WIGLE, OF WEST POINT, ILLINOIS.

IMPROVEMENT IN HARROWS.

Specification forming part of Letters Patent No. 120,140, dated October 17, 1871.

*To all whom it may concern:*

Be it known that I, JAMES WIGLE, of West Point, in the county of Hancock and State of Illinois, have invented a new and useful Improvement in Adjustable Harrow; and I do hereby declare that the following is a full, clear, and exact description thereof, which will enable others skilled in the art to make and use the same, reference being had to the accompanying drawing forming part of this specification.

Figure 1 is a rear view of my improved harrow. Fig. 2 is a top view of the same.

My invention relates to improvement in the class of harrows which is composed of sections hinged together in such a manner as to operate more or less independently of each other. The improvement consists in the construction and arrangement of the device for coupling the several harrows, whereby each harrow may rise and fall to accommodate itself to variations or undulations in the surface of the ground entirely independent of the others—*i. e.*, without affecting the position or operation of them.

A are three triangular harrow-frames, each consisting of two inclined side bars connected together at their forward ends, and connected and held in position by a cross-bar toward their rear ends. B are the teeth which are attached to the side and cross-bars of the frames A in the ordinary manner. C are two parallel cross-bars, the ends of which are attached to two short standards, D. To the lower ends of the standards D are attached eyes or hooks E, which interlock with eyes F attached to the cross-bars of the two outer harrow-frames A. The eyes F are adjustably attached to the said cross-bars of the frames A, so that by adjusting the positions of the said eyes the two outside harrows may be adjusted closer together or further apart, as may be desired. In the middle part of the cross-bar of the central harrow-frame A is formed a slot in which is pivoted the lower end of a rod, G, which passes up through holes in the middle parts of the cross-bars C, as shown in Figs. 1 and 2. By this construction either of the three harrow-frames A may incline toward either side, or rise or fall to accommodate itself to the surface of the ground without interfering with the position of the other frames. To the rear ends of the side bars of each of the frames A are attached the ends of semicircular bars H, to the upper parts of which may be attached handles $h'$ for convenience in handling the said frames. To the forward ends or angles of the frames A are attached draft-hooks I, upon which are hooked the links of short chains J attached to the center and end parts of the double-tree K. The end chains J should be adjustable so that they may be adjustable according to the adjustment of the outer harrow-frames. To the double-tree K, at equal distances from its central point, are coupled the whiffletrees L, as shown in Fig. 2. As shown in the drawing, the machine is adjusted for ordinary harrowing. For harrowing corn the central frame A is detached and the outside harrow-frames are adjusted at the proper distance apart. In this adjustment the rod G that supports the coupling-frame C D E F in an erect position being removed the said frame is held erect by the rod M, one end of which is connected with one of the standards D, and the other end has an eye formed upon it to be dropped over one of the handles $h'$, as shown in Fig. 2.

Having thus described my invention, I claim as new and desire to secure by Letters Patent—

In combination with the harrow-frames or sections A A A, the cross-bars C C, standards D D, eyes E F, and pivoted rod G, passing vertically through said bars, as shown and described, whereby each harrow has vertical movement independent of the others, for the purpose specified.

JAS. WIGLE.

Witnesses:
J. L. PIGGOTT,
R. A. PIGGOTT.